Sept. 21, 1937.                    C. A. SAWTELLE                    2,093,931
                                  BRAKE MECHANISM
                              Filed April 13, 1936                2 Sheets—Sheet 1
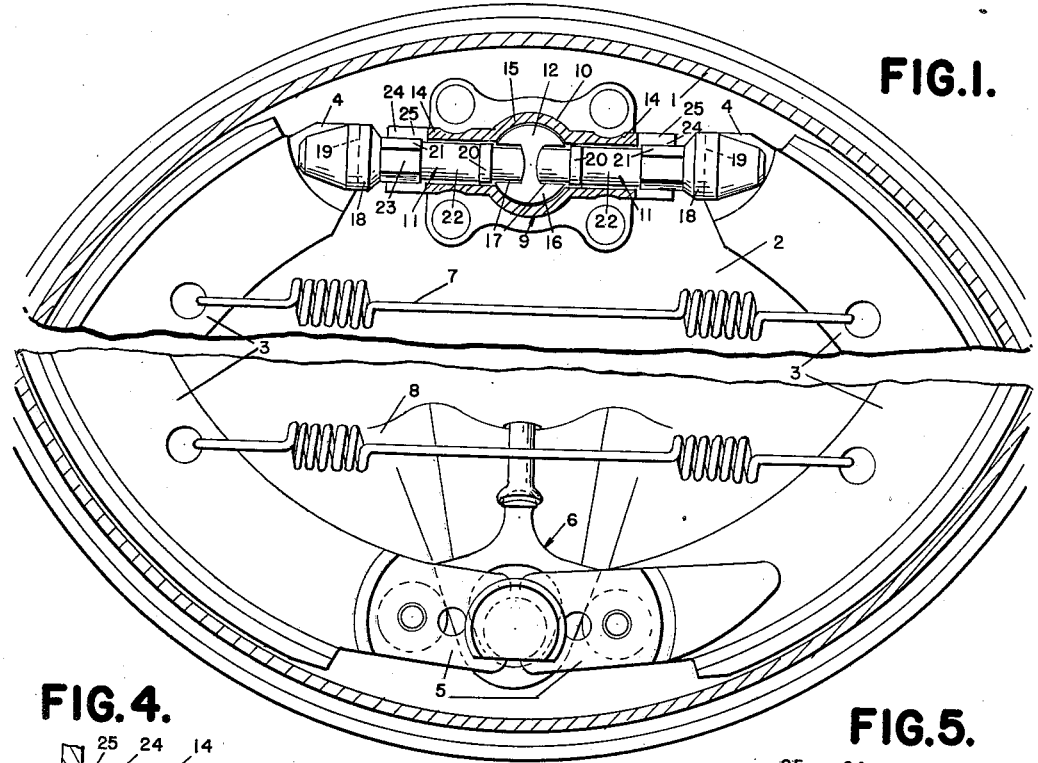
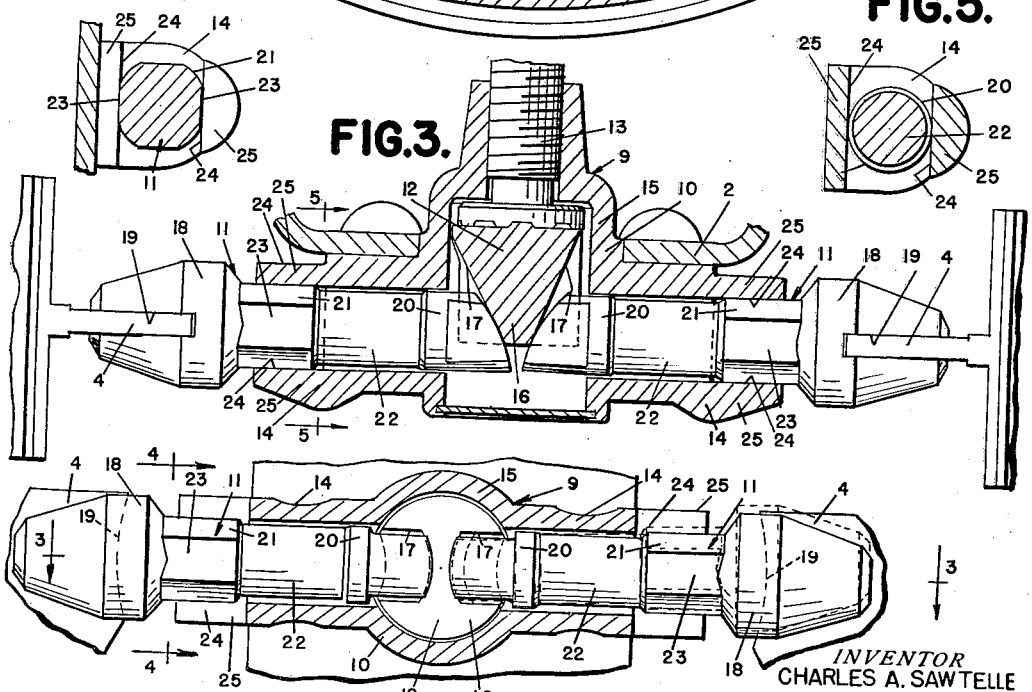
INVENTOR
CHARLES A. SAWTELLE
ATTORNEYS Sept. 21, 1937.　　　C. A. SAWTELLE　　　2,093,931

BRAKE MECHANISM

Filed April 13, 1936　　　2 Sheets-Sheet 2

*INVENTOR*
CHARLES A. SAWTELLE
BY
*ATTORNEYS*

Patented Sept. 21, 1937

2,093,931

UNITED STATES PATENT OFFICE 2,093,931

BRAKE MECHANISM

Charles A. Sawtelle, Detroit, Mich., assignor to Kelsey-Hayes Wheel Company, Detroit, Mich., a corporation of Delaware Application April 13, 1936, Serial No. 74,208

9 Claims. (Cl. 188—79.5)

The invention relates to brake mechanism and refers more particularly to adjustment anchor devices.

The invention has for one of its objects to provide an adjustment anchor device for a brake friction device arranged to allow movement of the friction device into and out of engagement with the brake drum and to guide the friction device during its movement. The invention has for another object to provide an improved adjustment device having its parts constructed to reduce the frictional resistance to movement. The invention has for a further object to construct an adjustment bracket which provides for angular movement of the adjustment link through a path parallel to the friction device and which holds the link from transverse movement or movement axially of the brake drum. The invention has for still further objects to construct the adjustment device in a manner to reduce the tendency of the adjustment link to upset at its inner end and in a manner to prevent change in the leverage exerted by the friction device to angularly move the adjustment link throughout the range of adjustment.

The invention has for other objects the novel features of construction and combinations and arrangements of parts as more fully hereinafter set forth.

In the drawings:

Figure 1 is a side elevation, partly in section, of a brake mechanism showing an embodiment of my invention;

Figure 2 is an enlarged section of the adjustment anchor device;

Figure 6:
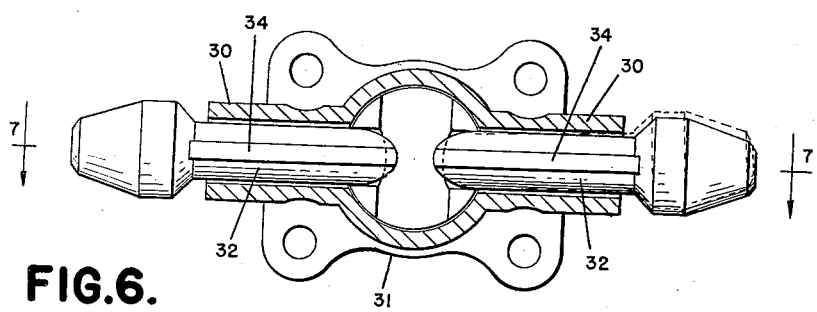
Figure 7:
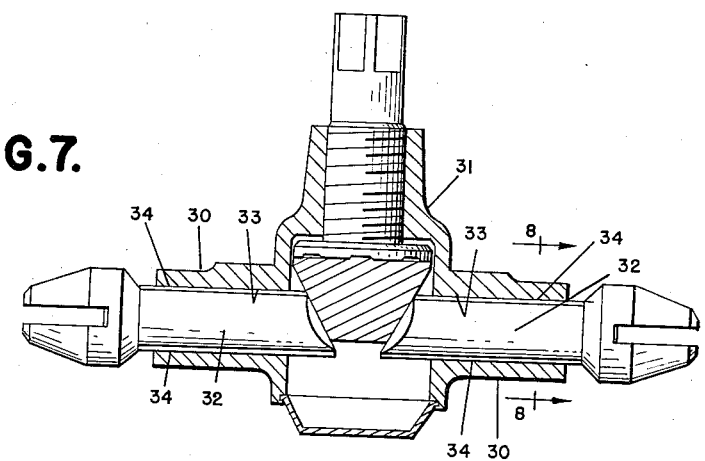
Figure 8:
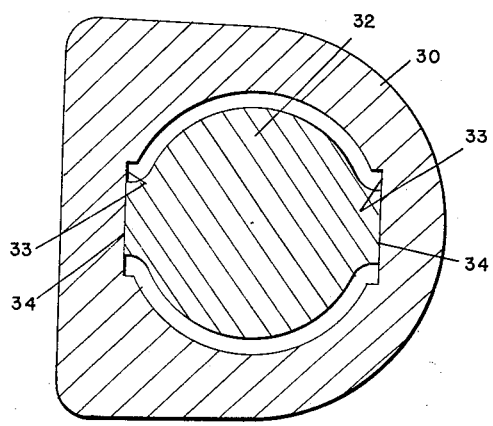

Figures 3 and 4 are cross sections on the lines 3—3 and 4—4 respectively of Figure 2;

Figure 5 is a cross section on the line 5—5 of Figure 3;

Figure 6 is a side elevational view, partly in section, of a slightly modified form of construction;

Figure 7 is a sectional view taken substantially on the plane indicated by the line 7—7 of Figure 6; and Figure 8 is a cross sectional view taken on the plane indicated by the line 8—8 of Figure 7.

The brake mechanism, as more fully illustrated in Figure 1, comprises the brake drum 1, the backing plate 2 and the brake friction device engageable with the drum. The friction device comprises the brake shoes 3 having the spaced upper ends 4 adapted to be anchored upon the backing plate and the spaced lower ends 5 engageable with a suitable actuator 6 which is adapted to spread the shoes apart into frictional engagement with the brake flange of the drum. Suitable coil springs 7 and 8 respectively between the upper and lower ends of the brake shoes are adapted to return the same to their normal or inoperative positions.

9 is the adjustment anchor device mounted upon the backing plate 2 and located between the upper ends 4 of the shoes. This device comprises the adjustment bracket 10, the pair of adjustment links 11, the adjustment wedge 12 carried by the bracket and engageable with the inner ends of the links to longitudinally adjust the same, and the adjustment screw 13 threadedly engaging the bracket and adapted upon rotation to longitudinally or axially adjust the wedge. The adjustment bracket has the spaced tubular portions 14 which are provided with axially aligned cylindrical bores through which the links extend. The bracket also has the tubular portion 15 which extends transversely through the backing plate 2 and which is internally threaded to receive the screw 13. The wedge 12 extends within the tubular portion 15 and between the links and, as shown, is formed of the cylindrical body 16 having the diametrically opposite longitudinally extending grooves 17, the bottom surfaces of which are inclined relative to the axis of the body and more particularly converge axially inwardly.

The links 11 are formed in the same manner and each link has at its outer end the head 18 which is provided with the diametral slot 19 for receiving the upper end of the adjacent shoe, this slot being parallel to the shoe or to its path of movement. The slot specifically receives the upper end of the stem or flange of the shoe which, as shown, is of T cross section and the bottom of the slot forms an abutment for the stem or flange. Each link has the longitudinally spaced inner and outer annular or circular enlargements 20 and 21 respectively which are formed upon its stem, the inner enlargement being at a predetermined or fixed distance from the bottom of the slot 19 and the outer enlargement being adjacent to the head 18. The portion 22 of the link stem intermediate the enlargements 20 and 21 is reduced and preferably of circular cross section. The opposite sides of the inner end portion of the inner enlargement are flattened for freely engaging in the cooperating groove 17 of the wedge so that the link may move angularly through a path parallel to the shoe without binding in the wedge groove. To provide for angular movement of the link the external diameter of the inner enlargement 20 is slightly less than the diameter of the bore of the tubular portion 14 and the outer enlargement 21 is located outwardly beyond the bore.

With the construction as thus far described, it will be seen that the shoes serve to hold the links from rotation and that the links may move angularly parallel to the shoes, or parallel to the direction of movement of the upper ends of the shoes and in doing so the inner enlargements of the adjustment links fulcrum about the bracket, the portions intermediate the enlargements being out of contact, thereby assisting in reducing the frictional resistance. It will also be seen that the inner enlargements are always at a fixed or predetermined distance from the bottoms of the slots in the heads at the outer ends of the links so that there is no change in the leverage exerted by the brake shoes to angularly move the links throughout the range of adjustment. This makes for uniform performance of the brakes during the life of the linings upon the shoes.

For the purpose of preventing transverse movement or movement axially of the drum of the outer ends of the links during brake applications, the outer enlargement 21 of each link is formed with a polygonal cross section and more particularly with a generally square cross section with rounded corners to provide the flat opposite sides 23 of extended area extending parallel to the sides of the slot 19 and the path of movement of the associated shoe. These flat sides of the outer enlargement are slidably engageable with the flat sides 24 of the furcations 25 which are formed at the outer end of the associated tubular portion 14. The furcations are preferably formed by slotting the outer end of the tubular portion. This construction is very important, since it compels the shoe to move toward and away from the drum and prevents wandering of the shoe and this makes for uniform controlled application. This control reduces vibrations which cause brake noises.

To reduce the tendency for the inner ends of the adjustment links to upset under torque and to reduce the friction on the outer ends of the links during their angular movement, the bottom surfaces of each wedge groove 17 and the inner end surface of the adjacent link which contacts with the bottom surface are made arcuate and both surfaces are struck from a common radius located on the axis about which the link swings from the full line position thereof shown in Figure 2 to the dotted line position shown in the same figure when the shoes are expanded. The arrangement is such as to permit the inner ends of the adjustment links to slide over the bottoms of the wedge grooves during angular movement of the links.

The embodiment of the invention featured in Figures 6 to 8 inclusive differs from the one previously described in that the polygonally shaped enlargements on the adjustment links are eliminated and the center of motion of each link is where it contacts with the adjustment wedge. In detail, the tubular extensions 30 of the anchor bracket 31 for receiving the adjustment links 32 are provided with longitudinally extending grooves 33 in diametrically opposite sides thereof for receiving flat longitudinally extending lands 34 on the adjustment links 32. The lands 34 are of less width than the grooves 33 and engage the flat side walls of the grooves to prevent transverse or axial movement of the links relative to the anchor bracket and to guide the links during the limited allowable movement of the same relative to the anchor bracket in a vertical plane passing through the axis of the drum. This construction permits the links to pivot about the inner ends thereof or in other words, about the adjustment wedge from the full line position shown in Figure 6 to the dotted line position shown in the same figure.

What I claim as my invention is:

1. In a brake mechanism, the combination with a brake drum and a brake friction device engageable with said drum, of an adjustment link operatively connected at its outer end to said friction device, said link having a stem with longitudinally spaced inner and outer enlargements, said outer enlargement having flat opposite sides of extended area extending parallel to the path of movement of said friction device, adjustable means engageable with the inner end of said link for longitudinally adjusting said link, and a bracket having a portion through which said link extends, said portion loosely engaging said inner enlargement and having a slot with flat sides engaging said flat sides of said outer enlargement whereby said link may move angularly relative to said bracket and will be held from movement axially of said drum during its angular movement and will positively guide said brake friction device during its movement into and out of engagement with said drum.

2. In a brake mechanism, the combination with a brake drum and brake shoes engageable with said drum and having spaced ends, of an adjustment anchor device for said shoes located between said spaced ends, said device comprising adjustment links having heads at their outer ends provided with slots for receiving said spaced ends, said links having stems with longitudinally spaced inner and outer enlargements and intermediate reduced portions, said outer enlargements having flat opposite sides of extended area extending parallel to the path of movement of said spaced ends, a wedge engageable with the inner ends of said links for longitudinally adjusting the same, and a bracket carrying said wedge and having portions through which said stems extend, said portions providing for fulcruming of said links about said inner enlargements and having slots at their outer ends formed with flat sides engaging said flat sides of said outer enlargements.

3. In a brake mechanism, the combination with a brake drum and a brake friction device engageable with said drum, of an adjustment link operatively connected at its outer end to said friction device, said link having a stem with an enlargement near its inner end, adjustable means engageable with the inner end of said link for longitudinally adjusting said link, and a bracket having a portion through which said link extends, said portion providing for fulcruming of said link about said enlargement.

4. In a brake mechanism, the combination with a brake drum and a brake friction device engageable with said drum, of an adjustment anchor device for said friction device comprising a bracket, and an adjustment link operatively connected at its outer end to said friction device, said link having a portion adapted to fulcrum upon said bracket and located at a fixed distance from the point of operative connection between said link and friction device.

5. In a brake mechanism, the combination with a brake drum and a brake friction device engageable with said drum, of a bracket, and an adjustment link provided with a slot at its outer end for receiving said brake friction device, the bottom of said slot forming an abutment, said link being also provided with an annular enlargement adapted to fulcrum about said bracket and located at a fixed distance from the bottom of said slot.

6. In a brake mechanism, the combination with a brake drum and a brake friction device engageable with said drum, of an adjustment anchor device for said friction device comprising a bracket, a wedge upon said bracket, and an adjustment link engageable at its inner end with said wedge and operatively connected at its outer end to said friction device, said link being angularly movable through a path parallel with said friction device and provided with a portion adjacent its inner end for fulcruming on said bracket, the contacting surfaces of said wedge and link being arcuate to provide for sliding of said link over said wedge upon angular movement of said link.

7. In a brake mechanism, the combination with a brake drum and a brake friction device engageable with said drum, of an adjustment anchor device for said friction device comprising a bracket, an angularly movable adjustment link operatively connected at its outer end to said friction device and provided with a portion near its inner end for fulcruming upon said bracket, and an adjustable wedge carried by said bracket for adjusting said link, said wedge having a surface for engaging the inner end surface of said link and both of said surfaces being arcuate with their axes coinciding substantially on the axis about which the link is fulcrumed whereby the inner end of said link may slide over said wedge during angular movement of said link.

8. In a brake mechanism, the combination with a brake drum and brake shoes engageable with said drum and having spaced ends, of an adjustment anchor device for said shoes located between said spaced ends, said device comprising a bracket, adjustable members operatively connected to said spaced ends of the shoes and movable angularly relative to said bracket in a plane parallel to the path of movement of the shoes, said adjustable members having flat portions on opposite sides and adjacent the outer ends thereof disposed in planes parallel to the plane of angular movement of the shoes, and means on said bracket having a sliding engagement with the flat portions at opposite sides of the adjustable members for holding the latter from movement axially of the drum.

9. In a brake mechanism, the combination with a brake drum and a brake friction device engageable with said drum, of an adjustment anchor device for said friction device comprising a bracket, an adjustment link operatively connected at its outer end to said friction device and having a portion fulcrumed upon said bracket affording movement of the link in a plane substantially parallel to the path of movement of the friction device, and cooperating engaging means upon said bracket and link for positively holding the link from movement axially of the drum.

CHARLES A. SAWTELLE.